United States Patent [19]

Somerville

[11] Patent Number: 4,511,807
[45] Date of Patent: Apr. 16, 1985

[54] ELECTRICAL GENERATOR CONTROL SYSTEM

[75] Inventor: William M. Somerville, Kirkwhelpington, England

[73] Assignee: Northern Engineering Industries plc, Great Britain

[21] Appl. No.: 481,169

[22] Filed: Apr. 1, 1983

[30] Foreign Application Priority Data

Apr. 20, 1982 [GB] United Kingdom ............... 8211437
Jun. 2, 1982 [GB] United Kingdom ............... 8216130

[51] Int. Cl.³ .............................................. H02P 9/04
[52] U.S. Cl. ........................................ 290/44; 290/42; 290/43; 290/54; 290/55; 322/28; 322/32
[58] Field of Search ................. 290/42, 43, 44, 52, 290/53, 54, 55; 322/25, 27, 28, 29, 32, 35, 68, 69, 70, 75, 76, 85, 91, 95, 96, 97

[56] References Cited

U.S. PATENT DOCUMENTS

| | | | |
|---|---|---|---|
| 2,118,124 | 5/1938 | Weeks | 290/44 |
| 2,152,576 | 3/1939 | Weeks | 290/44 |
| 3,166,702 | 1/1965 | Horsley | 318/266 X |
| 4,205,235 | 5/1980 | Pal et al. | 290/55 X |
| 4,219,768 | 8/1980 | Gobaud | 322/28 X |
| 4,228,362 | 10/1980 | Jacobs et al. | 290/44 |
| 4,413,218 | 11/1983 | Taylor et al. | 417/53 X |

FOREIGN PATENT DOCUMENTS

49096 3/1983 Japan ..................... 322/35

*Primary Examiner*—S. J. Witkowski
*Assistant Examiner*—Paul Shik Luen Ip

[57] ABSTRACT

A control system for a stand-alone electrical generator driven by a prime mover such as a wind turbine in which switches are operable in response to changes in the frequency of the generator output to change the load imposed on the generator by resistor means. The resistor means includes domestic resistive heaters and dump resistors, the switches for the former turning "on" at frequencies lower than those at which the latter turn "on". The frequencies at which the several switches in a given consumer's premises switch "on" are interlaced with the frequencies of the switches in other premises so as to avoid discrimination between consumers. The output frequency is thus kept relatively constant despite changes in wind speed.

14 Claims, 7 Drawing Figures

ELECTRICAL GENERATOR CONTROL SYSTEM

BACKGROUND TO THE INVENTION

This invention was conceived in relation to the control problem associated with the operation of a fixed pitch prime mover, especially a wind turbine for example, in relation to applications where the turbine is required to operate in a "stand alone" mode providing power of substantially constant voltage and frequency for one or several consumers. The invention has no less merit in the application of variable pitch turbines to similar stand alone applications, in particular for example, where the wind energy has to be distributed to a number of specific locations.

Figure 1:
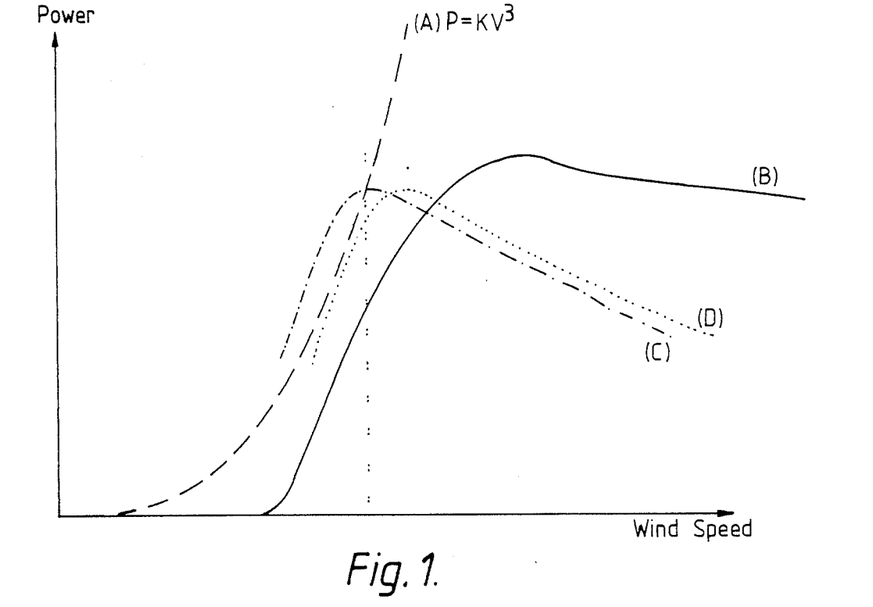
FIG. 1 is a diagram in which power is plotted against wind speed for an alternating current generator by a wind turbine.

The basic relationship is shown in FIG. 1 between the available energy in the moving air stream and the velocity of the air stream is displayed in curve A (broken line) where the power follows a cube law $p = kV^3$. The performance curve of a typical constant speed fixed pitch turbine is shown by the full line curve B. There is no output from the turbine until the wind speed has reached that value at which it can drive the turbine at the correct speed to produce the required frequency. When the wind speed rises further the output of the turbine will rise approximately linearly until the aerofoil of the turbine blades is operating at its optimum angle of attack to the relative air stream for most efficient operation. The efficiency of the turbine is now at its maximum as shown by the chain dotted curve C. A further increase in the wind speed will cause the air turbine wing to become progressively stalled as the angle of attack is increased. The efficiency of the air turbine begins to fall and the output power of the turbine tends to a limiting value before it also begins to decrease as the wind speed increases yet further.

If now the turbine is allowed to run at a higher RPM the turbine efficiency curve is moved to the right as shown by dotted curve D, and the available energy in curve A is considerably increased at the wind speed at which maximum turbine efficiency is obtained resulting in a significant increase in the power available from the turbine and in the limiting power as the wing goes into stall.

Since the mechanical components of the aerogenerator such as the turbine shaft, the gearbox and the generator are rated for a specific power level corresponding to the maximum expected power it is important that the turbine speed is controlled in order to limit the maximum power which may be passed through the transmission system and the generator.

The maximum power which can be produced by the turbine is proportional to the $RPM^3$ thus 5% increase in turbine speed will give an extra 15% power and conversely a reduction of 5% in the turbine speed will reduce the power by 15%.

This explanation has been included in order that the reason for an accurate and stable speed control system for the operation of a stand alone turbine may be fully understood in relation to the protection of the machinery and the optimum operating efficiency of the plant. This requirement is paramount and overrides the more commonly accepted reason for constant speed in that it relates to a constant frequency output.

It is necessary to distinguish between the need for limiting the maximum speed of the turbine as a power level limit and the operation of the turbine at slightly reduced speeds in low wind conditions where the improvement in the turbine efficiency at lower speed will give an enhanced output.

Figure 2:
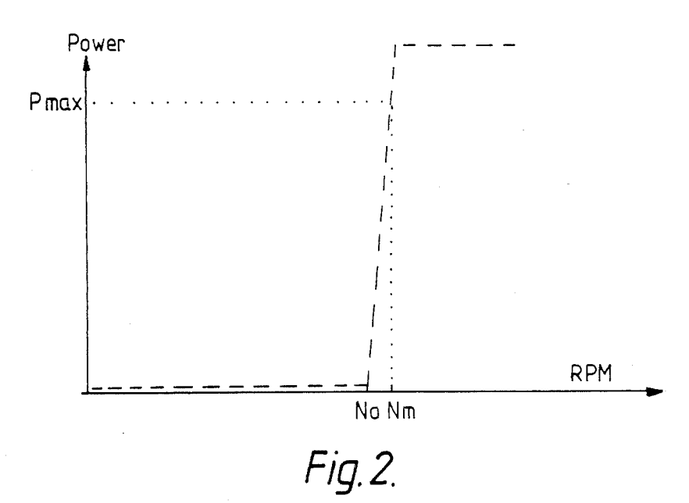
FIG. 2 is a diagram in which power is plotted against revolutions per minute for the same generator, showing a control characteristic.

The energy in the wind is by definition an uncontrollable quantity owing to the variable nature of the wind speed from moment to moment. The control problem is analogous to that of a car running down a hill of variable slope and the speed there can be controlled by applying a variable braking effort as the slope varies. In the case of an aerogenerator this may be done automatically by providing a load characteristic similar to that depicted in FIG. 2, where no load is applied to the machine until the speed of the machine has risen to the required operating speed No. As the speed rises above this value the load is increased rapidly until the maximum power is reached P max. at a slightly higher speed Nm. A slight positive increase in speed is necessary in order that a stable control system may be constructed.

Figure 3:
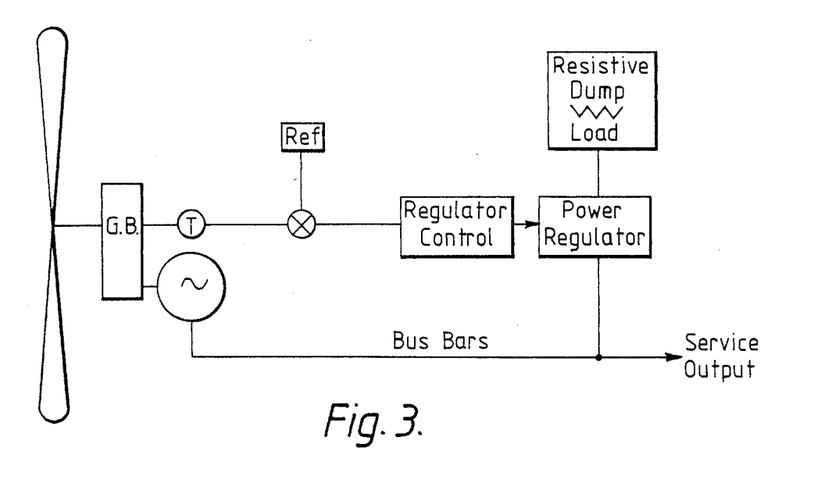
FIG. 3 is a schematic diagram illustrating a known method of generator control.

A known method whereby this control may be effected is shown in FIG. 3. Here the speed of the air turbine is monitored by means of the tachometer T which may be mounted on the turbine shaft or the generator shaft. The output from the tachogenerator is compared to a reference and when the tachogenerator output increases above the reference value, a signal is passed to a regulator control system which progressively turns on a power regulator allowing the energy in the busbars to be dissipated to a resistive dump load. Typically the power regulator could by a thyristor stack arranged to change progressively from fully off to fully on over the required speed range.

The deficiencies of this form of control are summarised briefly as follows:

The long term stability of the tachogenerator may cause a drift in the operating speed up or down and lead to an overload condition, or alternatively a loss of output.

Likewise a drift on the reference will have a similar effect. The system is vulnerable to loss of tacho signal or reference power supply.

Also a fault in the regulator control, regulator itself, or the unit dump load could lead to a loss of control or a serious unbalance in the case of a multi-phase alternator and busbar installation.

The use of a thyristor regulator in conjunction with a generating source of finite impedance will produce considerable harmonics on the busbars.

The resistive dump load must be sited within a reasonable distance of the air turbine in order to avoid unnecessary length of signal wires between the tachogenerator and the regulator control with the consequent risk of damage and vulnerability to pick up and interference.

BRIEF SUMMARY OF THE INVENTION

It is an object of the invention to provide an electrical generator control system capable of operation in "stand alone" mode.

An electrical generator control system, according to the invention, comprises an electric generator, resistor means, control means and switches operable to connect said resistor means to or disconnect the same from said generator, said control means being operable to cause said switches in response respectively to increase or decrease in the output frequency of said generator progressively to impose load on said generator by progressive connection of resistor means thereto or progressively to remove load therefrom by progressive disconnection of resistor means therefrom.

In one form of system, for example, in accordance with the invention, a number of frequency-controlled switches are used, each arranged to connect a specific portion of the load to the busbar when its set frequency has been exceeded. The control system for each of the frequency switches is preferably so arranged to be programmable so that discrete frequencies may be set at increments of, for example, 0.1 hertz.

A smooth increase in load is possible by using a suitable number of switches. If preferred, additional switches and resistor means beyond those necessary to dissipate the maximum power of the generator can be included in the system to provide a degree of redundancy.

BRIEF DESCRIPTION OF THE DRAWINGS

A generator control system will now be described by way of example to illustrate the invention with reference to the accompanying drawings in which.

DESCRIPTION OF THE PREFERRED EMBODIMENTS

Figure 4:
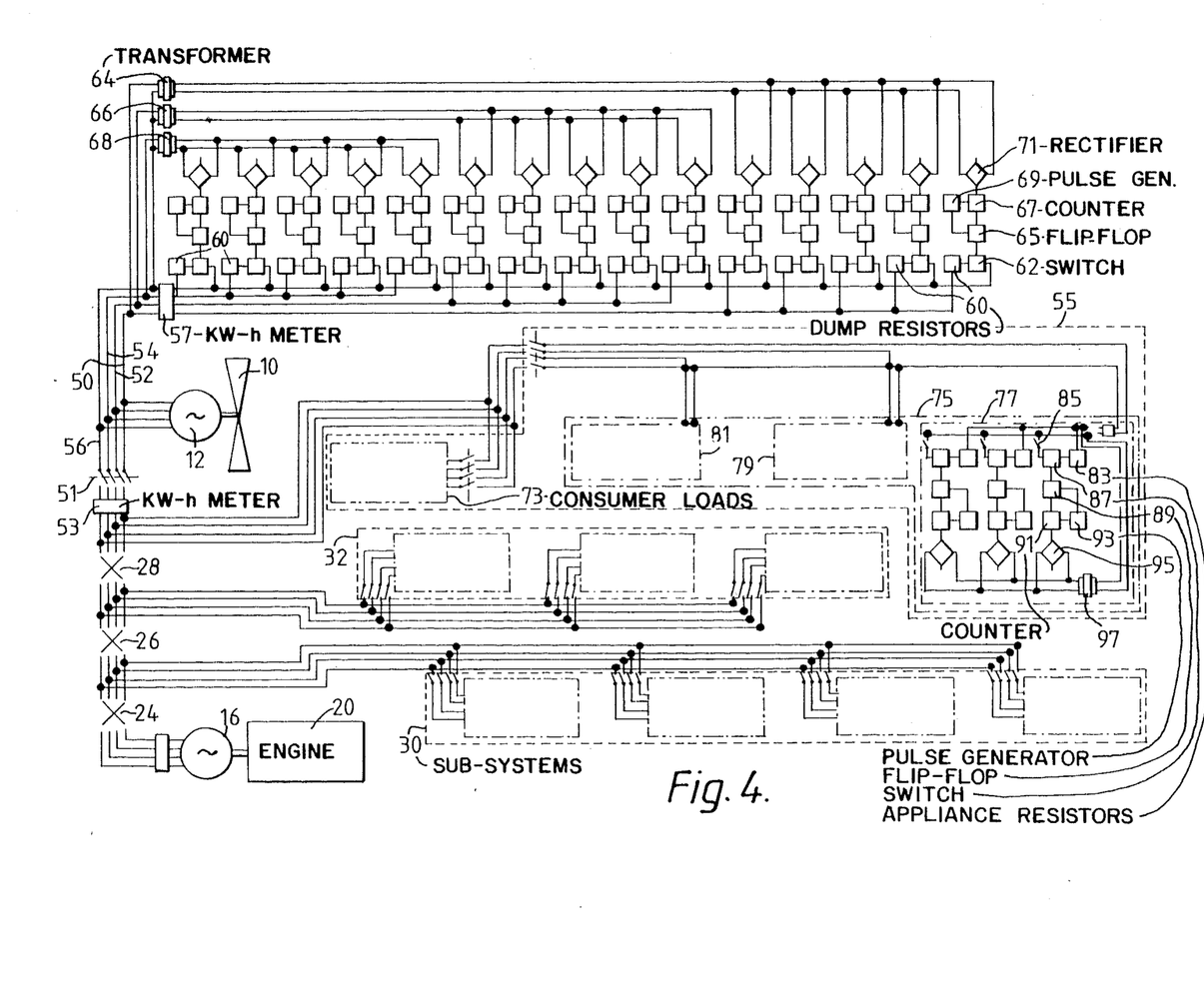
FIG. 4 is a schematic representation of an electricity supply system including a generator control system according to the invention.

As shown in FIG. 4, the wind-turbine 10 drives the alternator 12 which is shown yielding an output on three phases 50, 52, 54 and a neutral line 56. These phases pass via an isolator 51 and a kW-h meter 53 to output lines connected to a distribution sub-system 55. The three-phase output 50, 52, 54 is also connected permanently via a kilowatt-hour meter 57 to a frequency-responsive dump-load system comprising a bank of dump-resistors 60, each connected via a respective switch 62 to the neutral line 56. The resistors 60 and their respective switches 62 are grouped in three banks, one for each phase 50, 52, 54. The switches 62 may be, for example, solid-state relays of the type designated D2440/1 available from International Rectifier Ltd, which switch on or off in response to an electrical control signal only at the next subsequent zero crossing-point of the impressed alternating voltage.

The control signal for each switch 62 is provided by an integrated circuit flip-flop 65 which operates in response to a switch programmable binary ripple-counter 67 supplied with pulses from a crystal-controlled pulse-generator 69. Power for the control circuit is derived via smoothing capacitors (not shown) from a rectifier-bridge 71, part of the output from which is fed in an unsmoothed condition to a trigger pulse-generator forming a clock input-stage for the flip-flop 65 and providing master reset-pulses for the counter 67. The rectifier-bridges 71 supplying the control circuits for each bank of resistors 60 are linked to step-down transformers 64, 66, 68 connected, respectively, to the supply phase 50, 52 or 54 feeding the corresponding resistor-bank.

The purpose of each control circuit is to respond to the presence of a preset frequency of the voltage supplied by the appropriate transformer 64, 66 or 68. The occurrence of that particular frequency depends upon the speed of rotation of the generator 12 and hence the wind turbine 10. Each successive circuit controlling the individual dump-resistors 60 within the bank of resistors connected to any particular phase 50, 52 or 54 is programmed to turn on its associated switch 62 at a progressively higher frequency supplied by the corresponding transformer 64, 66 or 68, with the effect that as the speed of the wind turbine 10 and hence the supply frequency increase, the resistors 60 are progressively electrically connected between their respective phases and the neutral line 56 to give a step-wise increase in the applied load, limiting the acceleration of the wind turbine 10. Conversely, as the wind velocity falls and turbine speed and supply frequency reduce, the resistors 60 are progressively disconnected between their respective phases 50, 52 and 54 and the neutral line 56, reducing the electrical load applied to the turbine 10.

The resistors 60 and the switches 62, with their associated control circuits thus act as a governor, tending to limit the maximum speed of rotation of the wind turbine 10. The frequency range over which this process occurs is determined by programming the control circuits associated with the switches 62, and may extend typically from 53 Hz, when the first dump load resistor 60 is connected, to 54.4 Hz, when all resistors are connected, each successive resistor being introduced when the supply frequency increases by 0.1 Hz. Preferably, the lower limit of this range is chosen to match the characteristics of the wind turbine 10, being the supply frequency corresponding to the rotational speed at which maximum power is available, and the resistors 60 are specified to dissipate the limiting power generated as the turbine enters the stall condition described previously with reference to FIG. 1, even when no consumer appliance resistors, described below, are imposed as load on the generator 12.

Similar arrangements are provided at the consumer outlets within the distribution sub-system 55 shown schematically in FIG. 4, each phase being used to supply a number of consumers within one or more load blocks, two of which are indicated as 73, 75. Taking block 75 by way of example, one or more outlets are provided per phase. For clarity, only one such outlet 77, 79, and 81 is indicated for each of the phases 50, 52 and 54 respectively. Each outlet 77, 79, 81 is provided with a limited number, typically 3, of frequency-responsive solid-states switches 87 similar to the switches 62 controlling the dump-load resistors 60, but here used to supply consumer appliances representing appliance resistors indicated as 83 within the outlet 77. The latter is shown in more detail than, but is representative of, the other outlets 79 and 81. The resistors 83 are resistive loads used for water or space heating, for example, each in series with an on/off switch 85 operable by the house-holder. Each resistor 83 is also connected in series with a respective solid-state switch 87, rated as appropriate for the domestic application. Typically, this may be of the type designated BT 139 available from the Mullard Company, used in a de-rated mode to switch approximately 4 Amperes.

As in the dump-load control, each switch 87 is controlled by an integrated-circuit flip-flop 89 which operates in response to a switch-programmable binary ripple-counter 91 supplied with pulses from a crystal-controlled pulse generator 93. Power for the control circuit is derived via smoothing capacitors (not shown) from a rectifier-bridge 95, part of the output from which is fed in an unsmoothed condition to a trigger pulse-generator forming a clock input-stage for the flip-flop 89 and providing master reset-pulses for the counter 91. The rectifier-bridges 95 supplying the control circuits for the appliance resistors 83 are linked to a common step-down transformer 97 connected across the supply phase 50 and the neutral line 56.

The frequencies at which the domestic switches 87 turn "on" are almost all lower than the frequencies at which the dump-load switches 62 turn "on".

There is a slight overlap of the frequencies, the first dump resistor being imposed as load on the generator at 53 Hz, as mentioned above.

However, if preferred the ranges can be continuous or sequential rather than overlapping.

In order to reduce discrimination between consumers, as already mentioned, the frequencies of operation of the three switches at a given consumer outlet are interlaced with the frequencies of operation of the switches at the other consumer outlets within the distribution sub-system 55. In this way, no consumer can receive wind-derived electrical power from his second frequency circuit until the demands of all other consumers within the sub-system have been met from their respective first-frequency circuits. The differences between the frequencies of operation of any two switches which operate successively may be 0.1 Hz, as for the dump-load control circuits already described.

In addition to such interlacing, the consumers' outlets can be grouped for the purpose of frequency-distribution so that the first group provides a first outlet supply for every consumer at a first frequency, the second group provides a second outlet supply for every consumer and so on. As a further alternative, the consumers may be grouped so that the groups are supplied at successive frequencies at first outlets and then successively at second outlets at higher successive frequencies and so on. Combinations of interlacing and grouping are also possible. For example, group frequencies may be interlaced. The total frequency band extends from 50.2 Hz to 55 Hz and provides 49 steps of 0.1 Hz for each supply phase. Typically, only 15–20 steps are used to minimise the overall change of frequency. The resistors 83 within the domestic premises collectively serve to regulate the speed of the alternator 12 and turbine 10, in a manner analogous to the load imposed by the dump-load resistors 60. Ultimately, such resistors 83 and the dump-load resistors 60 produce a combined effect at sufficiently high wind speeds.

The principle of operation of the frequency-responsive circuits controlling the switches 62 for the dump-load resistors 60 is identical to that of the circuits controlling the switches 87 for the consumer appliance resistors 83, and will now be described. The reference numbers in parentheses relate to the corresponding element in the domestic circuits. Full wave rectified current is drawn from the rectifier-bridge 71 (corresponding to the bridge 95 at the consumer outlet) and used (unsmoothed) to produce current pulses of short duration within a circuit forming a clock input-stage for the flip-flop 65 (89). A subsidiary flip-flop (not shown) is used within the clock input-circuit to ensure that the current pulses are produced only at every alternate current-zero point on the unsmoothed fullwave rectified wave-form, and the clock input-circuit is designed to limit the duration of each pulse to about 2 microseconds. (These pulses, hereinafter called "frequency pulses") which are generated at the zero-crossing point for each complete cycle of the generator output-voltage waveform available on the corresponding supply line 50, 52 or 54, occur precisely at the frequency of the generator output. Changes in that frequency are monitored by timing the interval between successive frequency pulses. This is achieved by using the crystal-controlled pulse-generator 69 which provides a stable, high-frequency, current waveform, and counting the number of cycles of this waveform occurring between successive frequency pulses.

In the preferred embodiment this approach is extended to provide an electrical control signal in the event that the number of high-frequency cycles between successive frequency pulses falls below a preset value, indicating an increase in the output frequency. The crystal-controlled timing pulse generator 69 (93) operates at 3.276800 MHz and has a temperature stability of ±12.5 parts per million per degree C. over the range −20° C. to +70° C. The timing pulses are supplied to a programmable binary ripple-counter 67 (91) having 16 stages, giving a total capacity of 65536 timing pulses, which occur over a period of 20 milliseconds, corresponding to one cycle of a 50 Hz signal. Stages 8 to 16 of the counter 67 (91) provide an input to an associated array of logic gates, the final member of which is linked to the input of the flip-flop 65 (89). The logic array is so arranged that no signal can be provided to the flip-flop 65 (89) before 57344 timing pulses have been counted, when the three most significant binary stages of the counter have changed state.

The clock input-stage of the flip-flop 65 (89), which produces a short current frequency pulse (as described above) for every complete cycle of the output voltage waveform present on the corresponding supply line 50, 52 or 54, is also used to reset the counter 67 (91). No output is possible from the logic array until 17.5 milliseconds have elapsed from the start of any given cycle of the output voltage waveform. After this interval, the logic array produces an output only when all stages 8–13, including of the binary counter 67 (91), have changed state, or when this condition has been simulated by means of electrical input to the logic array from 6 preset switches (not shown) which constitute the programming elements for the counter 67 (91), or when some of the counter stages 8–13 have changed state and the remainder have been simulated by electrical input from the switches.

Depending upon the presetting of the switches to programme the counter 67 (91), the logic array is able to produce an output signal at any desired interval between 17.5 milliseconds and 20 milliseconds after the start of each cycle of the output voltage waveform, selectable in increments of 78 microseconds. When such an output signal is produced, it is used to inhibit the output from the timing-pulse generator 69 (93), thus arresting the counter 67 (91) and maintaining the logic output signal until the next counter reset pulse is available from the clock input stage to the flip-flop 65 (89).

If the interval between successive reset pulses exceeds that programmed into the counter 67 (91), a logic output signal is presented at the input to the flip-flop 65 (89), giving rise to a positive half-cycle output from the flip-flop, initiated upon receipt of the next clock input-pulse.

The output from the flip-flop 65 (89) is fed to the solid-state frequency-responsive switch 62 (87), which is maintained in the "off" state whilst the flip-flop output is positive, thus de-energising the resistive load 60 (83). Conversely, when the supply frequency increases, the period between successive reset pulses is reduced to below that programmed into the counter. No logic output signal is now produced and the output of the flip-flop 65 (89) is held at zero for the ensuing half-cycle, causing the frequency-responsive switch 62 (87) to turn "on" to energise the resistive load 60 (83). The type of switch 62 (87) used, examples of which have been quoted above, will only turn on or off at zero-crossing point on the output voltage wave-form, which minimises radio-frequency interference.

FIG. 4 also indicates a diesel engine 20 driving an alternator 16 and connectable via the circuit-breakers 24, 26, 28 to distribution sub-systems 30, 32 and 55. This arrangement, which is shown merely by way of example, enables the total demand to be met by diesel or wind-generated power, or by a combination of the two, thus catering for varying demand and wind speeds, as outlined above.

The invention can however, be used in many other applications whether in conjunction with diesel-driven generators or otherwise.

Figure 5:
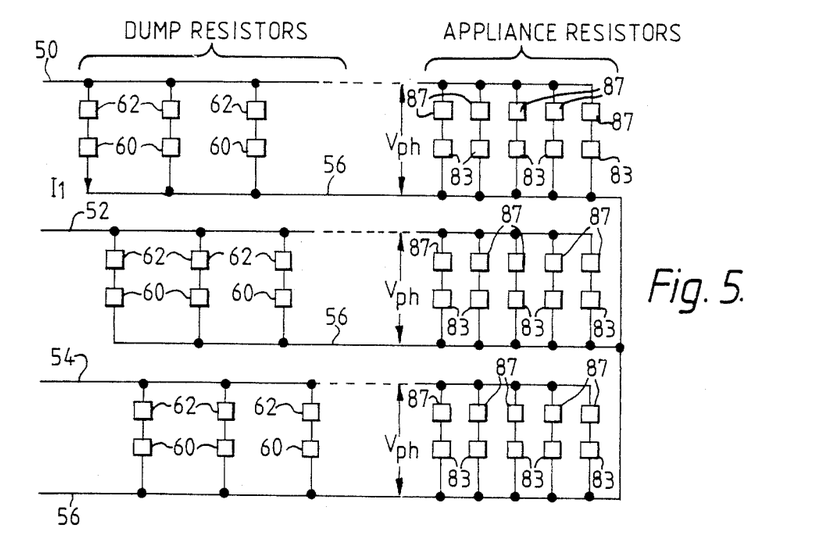
FIGS. 5 to 7 are schematic scrap representations showing further details of circuitry usable in the system shown in FIG. 4, including modifications.
Figure 6:
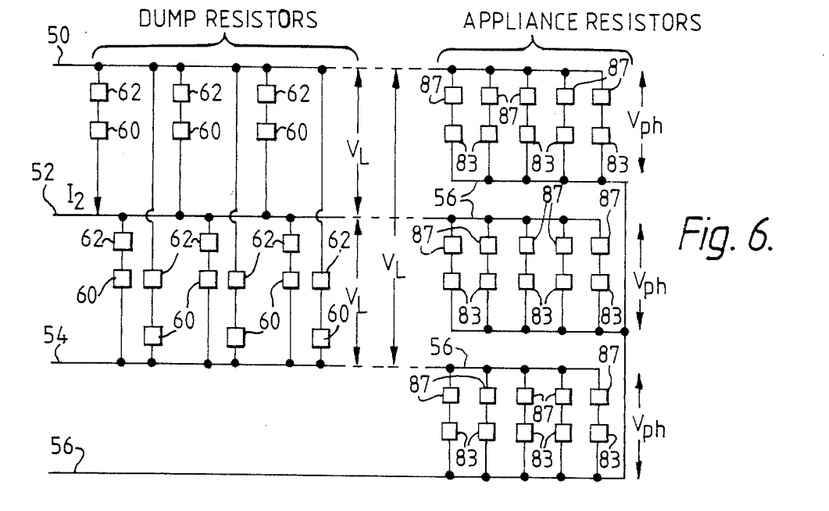

Typically fifteen dump load resistors 60 are used, as shown in FIG. 4. FIG. 5 shows such resistors 60 connected in star, i.e. between a phase line 50, 52 or 54 and the neutral line 56 in each case, as in FIG. 4. FIG. 6 shows them connected alternatively in delta, in between phase lines 50 and 52, 52 and 54 and 50 and 54 in sequence.

In FIG. 5 the applied voltage to the circuit is Vph and the current in the first resistor to be connected into the circuit will be $I_1 = W/Vph$ where W is the required increment of load. In FIG. 6, the circuit current $I_2 = W/V_L$.

The relationship between phase-voltage and line-voltage in rms terms is $V_L = \sqrt{3}\, Vph$ and it therefore follows that $I_2 = I_1/\sqrt{3}$. Thus $I_2 = 0.577\, I_1$.

Since the dump load banks represent large increments of system load, typically 7–10% of the rated aerogenerator output on all phases, it follows that $I_1$ will be 21–30% of rated phase-current. This large current step interacting with the cable impedance will cause a step reduction in voltage which can affect the brightness of tungsten filament lamps. Since under operating conditions the load may be switched in and out relatively quickly in performing its speed-controlling function, it is possible that appreciable fluctuation of the brightness of such lamps will cause annoyance.

Delta-connected elements reduce the current step to 12–17% of the rated phase-current and result in correspondingly less volt-drop and appreciably less flicker from tungsten filament lamps.

The appliance resistors 83 in FIGS. 5 and 6 where voltage limitations apply remain star-connected for this reason but if an industrial consumer exists the loading could, if desired, be spread over three phases and treated advantageously as for the dump load.

For larger systems, where the marginal cost advantage of applying the load in sequential phase-rotation becomes minimal or disappears, the application of the dump load in balanced three-phase groups is preferable as the generator loading is thus also balanced. This can be done by arranging for three switches 62 to operate simultaneously as in the arrangement shown at A in FIG. 7.

Figure 7:
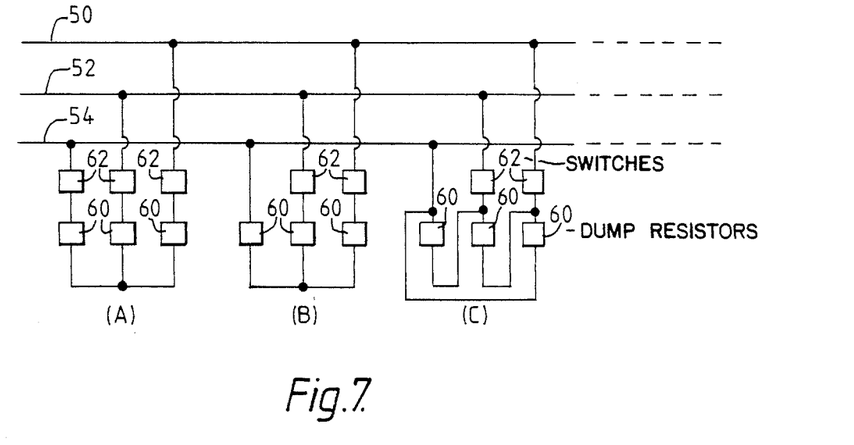

The same effect is obtained in alternative schemes shown at B and C in FIG. 7 by using only two switches openable simultaneously. The operation of this circuit is unaffected if the dump resistors 60 are connected in star or delta with the appropriate ohmic values.

For fifteen dump resistors 60, for example, five identical schemes A, B or C would be used, the resistors 60 being connected in each scheme as shown in the respective scheme illustrated. For larger or other numbers of dump resistors 60 the number of schemes used would be selected accordingly.

However, many schemes A or B or C are used in any system, the switches 62 in the first scheme operate at a first predetermined frequency in exactly analogous manner to the operation of a single switch as described above with reference to FIG. 4. Then, the switches 62 in the second scheme operate at a second predetermined frequency and so on through all the schemes in the system. The schemes A, B and C therefore are analogous to the arrangements shown in FIGS. 4, 5 and 6 in that switches are operated progressively to connect load to or disconnect load from the generator.

As still further alternatives, two switches 62 can be turned "on" simultaneously in scheme A at a frequency, followed by turning "on" of the third switch 62 at the next frequency in the series; or one switch 62 can be turned "on" in scheme B or C at one frequency followed by turning "on" of the other switch 62 at the next frequency in the series.

In each of those last-mentioned further alternatives the effect is equivalent to a single phase-load between lines.

In all three schemes A, B and C there is no connection to the neutral line 56. The star point in schemes A and B is "floating".

For fifteen dump resistors 60, using the first-mentioned further alternative available with scheme A, two switches 62 are turned "on" at the first frequency in the first of the five schemes A. Then the third switch 62 in that first scheme is turned "on" at the next frequency in the series. Then two switches are turned "on" in the second scheme at the next frequency followed by the third switch turning "on" in the second scheme at the next frequency. The sequence for five schemes A-1 to A-5 each containing three switches 60 say (i), (ii), (iii) at ten frequencies F-1 to F-10 is as follows: at F-1 switches (i) and (ii) of A-1 turn "on"; at F-2 switch (iii) of A-1 turns "on"; at F-3 switches (i) and (ii) of A-2 turn "on"; at F-3 switch (iii) of A-2 turns "on"; and so on up to F-9 switches (i) and (ii) of A-5 turn "on" and finally at F-10 switch (iii) of A-5 turns "on".

For the second and third mentioned further alternatives available with scheme B or C in either case for fifteen dump resistors in five schemes and using ten frequencies F-1 to F-10 the sequence is: at F-1 switch (i) of B-1 (or C-1) turns "on"; at F2 switch (ii) of B-1 or (C-1) turns "on"; at F-3 switch (i) of B-2 (or C-2) turns "on"; at F-4 switch (ii) of B-2 (or C-2) turns "on"; and so on until at F-9 switch (i) of B-5 (or C-5) turns "on"; and finally at F-10 switch (ii) of B-5 (or C-5) turns "on".

The power dissipated in two dump resistors each of value R connected in star relationship with a third resistor when the two resistors are connected one to one line and one to another line with a voltage difference V between the lines is $V^2/2R$. This is the condition in scheme A with two switches 62 "on" and is the condition in scheme B or C with one switch 62 "on".

The power dissipated in the same three resistors connected in star to the three lines with a mutual voltage difference of V is $V^2/R$. This is the condition in scheme A with all three switches 62 "on" and in scheme B with both switches 62 "on".

The power dissipated in three resistors each of value 3 R connected in delta between three lines with a mutual voltage difference of V is $V^2/R$.

This is the condition in scheme C with both switches 62 "on".

The systems described above with reference to FIGS. 4 to 7 by way of example, have a number of advantages.

The use of multiple identical units programmable as required, aids manufacture and reduces the unit size of the control elements.

The use of multiple load control switches with a quantity in reserve means that the failure of any single unit does not effect the system as the load is passed to the next in line.

Since the load is controlled by frequency, it is no longer necessary for the resistive load to be placed adjacent to the wind turbine and it may be more conveniently placed at the site where the waste heat produced may be utilised for some useful purpose.

The use of multiple elements of control load allows the load to be applied in sequential mode to the various phases of a multiphase generator system to maintain a substantially balanced load up to the maxmimum load of the generator.

Where a known unbalance exists on a three-phase distribution system, it is possible to re-programme the load control switches in order to improve the balance on the generator.

The use of a frequency-sensitive load-control, which may be mounted anywhere on the system, automatically lends itself, if preferred, to the distribution of power surplus to normal essential service requirements to dwellings on the network where it may be utilised for water heating or background heating rather than merely dissipated without useful effect.

The close frequency spacing of the switch settings permits the distribution of the maximum available power from the turbine for domestic consumption, with the subsequent allocation of higher frequencies for a master controlling dump load should the demand by consumers for this beneficial service be insufficient to provide enough load to retard the machine.

Excellent utilisation of energy from the wind is possible from a generator of a given size for the benefit of the community which it supplies. This benefit can be distributed using an existing network.

On a distributed network should one of the feeders be lost due to a fault the remaining feeders may remain in service and only the power which would have been absorbed by the lost feeder will be dissipated to atmosphere in the master control dump load.

The speed regulation possible with the system is such that it is possible to operate the system in parallel with a diesel alternator system, if preferred, when wind conditions are marginal and diesel assistance is judged necessary to maintain the essential services supply.

The diesel alternator system need only be sized to cope with the essential services demand.

By suitably matching the governor characteristics of the diesel alternator set with the selected operating frequencies, it is possible to ensure that the diesel operates at a high load factor when the essential service demand is variable. This ensures the maximum benefit from the diesel fuel consumed.

This control system is equally applicable to single-phase and three-phase generators but it is preferable when the wind turbine is operating in parallel with a diesel generator that three-phase systems should be selected due to the better synchronising torque available on the three-phase machines.

The typical operating frequency band, for example, is 1.5 to 2.0 cycles, depending on the number of control elements in service.

The system is extremely fast in response since a decision is made during each half cycle of the supply on each phase whether to increase or decrease the load.

A distributed control load arrangement implies a degree of discrimination in the distribution of energy due to the separation of the set switching points which are subject to the available energy. However, it is possible to improve the distribution by allocating each potential consumer of the surplus energy a number of discrete switching frequencies, typically three, and arranging to interlace these frequencies with other consumers in such a manner so that all consumers receive at least one switching point before the distribution of the second switching point.

Since the main application for this sytem is on small remote networks, the flexibility of the control system and the ability to re-programme individual consumer units allows executive decision by those managing the system to allocate power priority to those in greatest need, e.g. the elderly and those families with very young children.

Bearing in mind that the first requirement of an aerogenerator is to provide essential services such as lighting and entertainment, the ability with this system to provide a distribution of the surplus energy collected by the wind turbine represents a bonus in the operation of such a machine and the consideration of a dual tariff system follows naturally with a higher unit charge for the essential services and a much reduced tariff for the distributed control power.

The ability to provide energy to households in the manner described allows savings in auxiliary fuels such as oil, coal, and wood, normally required for heating. The benefit of low cost background dry heat in dwellings on an island or shore community would improve the standard of accommodation in a way not readily appreciated by those mainland based due to the reduction in humidity within the houses.

What is claimed is:

1. An electrical generator control system comprising:
   (a) an electric generator;
   (b) a plurality of appliance resistors;
   (c) a plurality of dump resistors;
   (d) switches first and second ones of which are associated with said appliance resistors and said dump resistors, respectively, each said switch being operable, in response to increases or decreases in the frequency of the output of said generator, at a predetermined value of said output frequency, which operation, in the case of each appliance resistor, at least renders the respective resistor connectable to or disconnectable from said generator respectively to impose load thereon or to remove load therefrom and, in the case of each dump resistor, connects or disconnects the respective resistor to or from said generator respectively to impose load thereon or remove load therefrom, said predetermined values of frequency representing a range of values of frequency which increase progressively through said range, at least some of said first ones of said switches being operable at predetermined values of said output frequency which are lower than said predetermined values of frequency at which said second ones of said switches are operable; and (e) control means for operating said switches at the respective frequencies, said control means comprising for each switch frequency pulse-generating circuitry for generating a train of frequency pulses corresponding to said output frequency, a timing pulse generator and counting means, changes in said output frequency being detectable as changes in the number of timing pulses counted by said counting means between successive frequency pulses in said train.

2. A system according to claim 1, serving a plurality of consumers each said consumer having a respective group of said connections which are controlled by respective members of a respective group of said first switches, in which said first frequencies of said first switches in each said group thereof are interlaced with said first frequencies of said first switches in the others of said groups thereof.

3. A system according to claim 1 serving a plurality of consumers each said consumer having several said appliance resistor means in which said consumers are grouped in groups and said connections are effected by said first respective switches at respective first frequencies assigned to said groups.

4. A system according to claim 1, in which the output of said generator is transmitted from the generator using three phase lines and a neutral line and in which said dump resistors comprise a plurality of groups each comprising three dump resistors connectable in star mode between said neutral line and respective ones of said phase lines by respective second ones of said switches and in which load is distributed among said phase lines by successive operation of said second ones of said switches in a first of said groups at respective succeeding output frequencies followed by successive operation of said second ones of said switches in each succeeding group at respective succeeding output frequencies.

5. A system according to claim 1, in which the output of said generator is transmitted from the generator using three phase lines and a neutral line and in which said dump resistors comprise a plurality of groups each comprising three dump resistors connectable in delta mode between respective pairs of said phase lines by respective second ones of said switches and in which load is distributed between said phase lines by successive operation of said second ones of said switches in a first of said groups at respective succeeding output frequencies, followed by successive operation of said second ones of said switches in each successive group at respective further succeeding output frequencies.

6. A system according to claim 1, in which the output of said generator is transmitted from the generator using three phase lines and a neutral line and in which said dump resistors comprise a plurality of groups each comprising three dump resistors connectable in star mode between a common floating star point and respective ones of said phase lines by respective second ones of said switches each arranged between the respective resistor and said star point and in which load is distributed among said phase lines by simultaneous operation of said second ones of said switches of a first of said groups at a common output frequency, followed by simultaneous operation of said second ones of said switches in each succeeding group at respective succeeding common output frequencies.

7. A system according to claim 1, in which the output of said generator is transmitted from the generator using three phase lines and a neutral line and in which said dump resistors comprise a plurality of groups each comprising three dump resistors connectable in star mode between a common floating star point and respective ones of said phase lines by respective second ones of said switches each arranged between the respective resistor and said star point and in which load is distributed by simultaneous operation of two of said second ones of said switches in a first group at a common output frequency, followed by operation of the third of said second ones of said switches in said first group at a succeeding output frequency, followed by similar operation of two of said second ones of said switches then of the third of said second ones of said switch in each succeeding group at respective further succeeding output frequencies.

8. A system according to claim 1, in which the output of said generator is transmitted from the generator using three phase lines and a neutral line and in which said dump resistors comprise a plurality of groups each comprising three dump resistors connectable in star mode between a common floating star point and respective ones of said phase lines, two of said three dump resistors being connected by respective second ones of said switches each arranged between the respective resistor and said star point and the third of said three dump resistors being permanently connected to said star point and in which load is distributed by simultaneous operation of both said second ones of said switches in a first group at a common output frequency followed by simultaneous operation of said second ones of said switches in each succeeding group at respective common output frequencies.

9. A system according to claim 1, in which the output of said generator is transmitted from the generator using three phase lines and a neutral line and in which said dump resistors comprise a plurality of groups each comprising three dump resistors connectable in star mode between a common floating star point and respective ones of said phase lines, two of said three dump resistors being connected by respective second ones of said switches each arranged between the respective resistor and said star point and the third of said three dump resistors being permanently connected to said star point and in which load is distributed by operation of one of said second ones of said switches in a first group at a first output frequency followed by operation of the second of said second ones of said switches at a succeeding output frequency followed by similar successive operation of the two said second ones of said switches in each succeeding group at respective further succeeding output frequencies.

10. A system according to claim 1, in which the output of said generator is transmitted from the generator using three phase lines and a neutral line and in which said dump resistors comprise a plurality of groups each comprising three dump resistors connectable in delta mode between respective pairs of said phase lines by two of said second ones of said switches arranged outside said delta between respective ones of said phase lines and respective connection points of said delta at which dump resistors therein are interconnected and in which load is distributed among said phase lines by simultaneous operation of said second ones of said switches in a first of said groups at a common output frequency followed by simultaneous operation of said second ones of said switches in each succeeding group at respective succeeding common output frequencies.

11. A system according to claim 1, in which the output of said generator is transmitted from the generator using three phase lines and a neutral line and in which said dump resistors comprise a plurality of groups each comprising three dump resistors connectable in delta mode between respective pairs of said phase lines by two of said second ones of said switches arranged outside said delta between respective ones of said phase lines and respective connection points of said delta at which dump resistors therein are interconnected and in which load is distributed by operation of one of said second ones of said switches in a first group at a first output frequency followed by operation of the other of said second ones of said switches in the same group at a succeeding output frequency followed by similar successive operation of the two of said second ones of said switches in each succeeding group at respective succeeding output frequencies.

12. A system according to claim 1, in which, in said control means, said counting means comprises a programmable counter.

13. A system according to claim 1 or claim 12, in which, in said control means, said frequency pulse-generating circuitry includes flip-flop circuit means for producing said train of frequency pulses which are used to reset said counting means.

14. A system according to claim 1, in which, in said control means, flip-flop circuit means is operable in response to a signal from said counting means to operate said switch controlled thereby.

* * * * *